United States Patent
Ikejima

(10) Patent No.: US 9,672,219 B2
(45) Date of Patent: Jun. 6, 2017

(54) DOCUMENT MANAGEMENT SYSTEM AND RECORDING MEDIUM

(71) Applicant: KYOCERA Document Solutions Inc., Osaka (JP)

(72) Inventor: Ayaka Ikejima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 323 days.

(21) Appl. No.: 14/333,790

(22) Filed: Jul. 17, 2014

(65) Prior Publication Data

US 2015/0026118 A1    Jan. 22, 2015

(30) Foreign Application Priority Data

Jul. 22, 2013  (JP) .................. 2013-152000

(51) Int. Cl.
*G06F 7/00*   (2006.01)
*G06F 17/00*  (2006.01)
*G06F 17/30*  (2006.01)

(52) U.S. Cl.
CPC .. *G06F 17/30165* (2013.01); *G06F 17/30011* (2013.01)

(58) Field of Classification Search
None
See application file for complete search history.

(56) References Cited

U.S. PATENT DOCUMENTS

| | | | |
|---|---|---|---|
| 5,535,332 A | | 7/1996 | Ishida |
| 5,781,915 A | * | 7/1998 | Kohno ............... G06F 17/2211 |
| | | | 707/999.008 |
| 8,081,335 B2 | | 12/2011 | Takahashi et al. |
| 2008/0123136 A1 | | 5/2008 | Takahashi et al. |

FOREIGN PATENT DOCUMENTS

| | | |
|---|---|---|
| JP | H06-19656 A | 1/1994 |
| JP | 2008-135966 A | 6/2008 |
| JP | 2009-143123 A | 7/2009 |

\* cited by examiner

*Primary Examiner* — Jau-Shya Meng
(74) *Attorney, Agent, or Firm* — Studebaker & Brackett PC

(57) ABSTRACT

A document management system includes: a shared storage section that stores document information so as to share the document information among shared users; an access management section that permits access to the shared storage section by each shared user through authentication; a history acquiring section that acquires a record of an operation that is input for the document information by any shared user; an SNS server function section that generates a social timeline showing specific pieces of information in time sequence and generates, for each shared user, a history timeline that is a social timeline showing as the specific pieces of information the operation records acquired for the shared users; and a timeline display processing section that acquires, for each shared user, a history timeline reflecting the state after the authentication of the shared user to display the history timeline showing the operation records in time sequence.

5 Claims, 8 Drawing Sheets

DOCUMENT MANAGEMENT SYSTEM AND RECORDING MEDIUM

INCORPORATION BY REFERENCE

The present application claims priority under 34 U.S.C. §119 to Japanese Patent Application No. 2013-152000, filed Jul. 22, 2013. The contents of this application are incorporated herein by reference in their entirety.

BACKGROUND

The present disclosure relates to a document management system for managing records of operations input to an image forming apparatus for operating document information and also relates to a recording medium.

An image forming apparatus, such as a digital multifunction peripheral, has a box function of storing image information that is, for example, read by a scanner or the like into an image storage area called a box. An image forming apparatus having the box function can serve as a document server. Therefore, an image forming apparatus having the box function is used for sharing document information among a plurality of members working in an office.

A technology for processing shared document information allows a plurality of shared users to share update information of the documents that are shared among the shared users.

According to this technology, update information of each update, such as the date and time or the contents of the update, made to the document information is stored into the storage section of an image forming apparatus, and the update information thus stored is displayed piece by piece in a specific form on the image forming apparatus. This allows the users to share the update information related to the document information and view the update records (operation records).

Unfortunately, since the update information of each update, such as the date and time or the contents of the update, is displayed piece by piece in the specific form, it is difficult to comprehend the operation records at a glance.

SUMMARY

According to a first aspect of the present disclosure, a document management system includes: a shared storage section configured to store document information so as to share the document information among a plurality of shared users; an access management section configured to permit access to the shared storage section by each shared user through authentication; a history acquiring section configured to acquire a record of an operation that is input for the document information by any of the shared users permitted to access the shared storage section; an SNS server function section having a social networking function of generating a social timeline showing specific pieces of information in time sequence and configured to generate a history timeline for each shared user, each history timeline being a social timeline showing as the specific pieces of information the operation records acquired for the shared users permitted to access the document information; and a timeline display processing section configured to acquire, for each shared user, a history timeline that reflects a state after the authentication of the shared user to display the history timeline showing the operation records in time sequence.

According to a second aspect of the present disclosure, document management method involves: (i) storing, through a shared storage section, document information so as to share the document information among a plurality of shared users; (ii) permitting, through an access management section, access to the shared storage section by each shared user; (iii) acquiring, through a history acquiring section, a record of an operation that is input for the document information by any of the shared users permitted to access the shared storage section; (iv) generating, through an SNS server function section having a social networking function of generating a social timeline showing specific pieces of information in time sequence, a history timeline for each shared user, each history timeline being a social timeline showing as the specific pieces of information the operation records acquired for the shared user permitted to access the document information; and (v) acquiring, through a timeline display section and for each shared user, a history timeline that reflects the state after the authentication of the shared user to display the history timeline showing the operation records in time sequence.

According to a third aspect of the present disclosure, a non-transitory computer readable recording medium stores a document management program. The document management program is for causing a computer to implement a shared storage function, an access management function, a history acquiring function, an SNS server function, and a timeline display processing function. The shared storage function is a function of storing document information so as to share the document information among a plurality of shared users. The access management function is a function of permitting access to the shared storage section by each shared user through authentication. The history acquiring function is a function of acquiring a record of an operation that is input for the document information by any of the shared users permitted to access the shared storage section. The SNS server function has a social networking function of generating a social timeline showing specific pieces of information in time sequence and is a function of generating a history timeline for each shared users. Each history timeline is a social timeline showing as the specific pieces of information the operation records acquired for the shared users permitted to access the document information. The timeline display processing function is a function of acquiring, for each shared user, a history timeline that reflects the state after the authentication of the shared user to display the history timeline showing the operation records in time sequence.

DETAILED DESCRIPTION

An aim is to allow a plurality of shared users who share document information to share operation records related to the document information in a manner that the shared users can readily keep track of the operation records. The aim is achieved by a document management system 1 with the use of a social networking function of generating a social timeline showing specific pieces of information in time sequence.

More specifically, with the use of the social networking function, the document management system 1 acquires the records of operations input for the document information by the shared users, and generates, specifically for each user, a history timeline showing the operation records as the specific pieces of information.

The social networking function may be provided by an SNS management server that manages a social network. Instead of the SNS management server, however, the function may be provided by an electronic device that stores document information in a manner to allow the sharing.

The electronic device is not specifically limited and may be, for example, an image forming apparatus or the like having the box function for sharing document information among a plurality of shared users.

The following now describes an embodiment of the present disclosure with reference to the accompanying drawings.

[Configuration of Document Management System]

Figure 1:
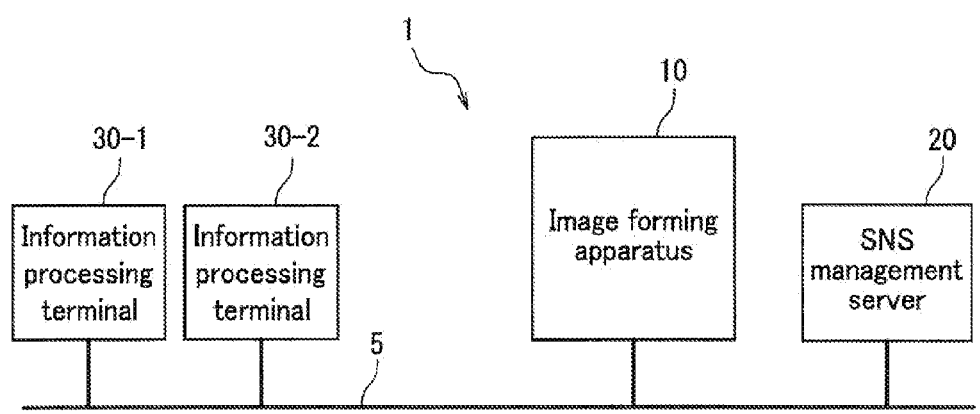
FIG. 1 shows a configuration of a document management system according to an embodiment of the present disclosure.
Figure 2:
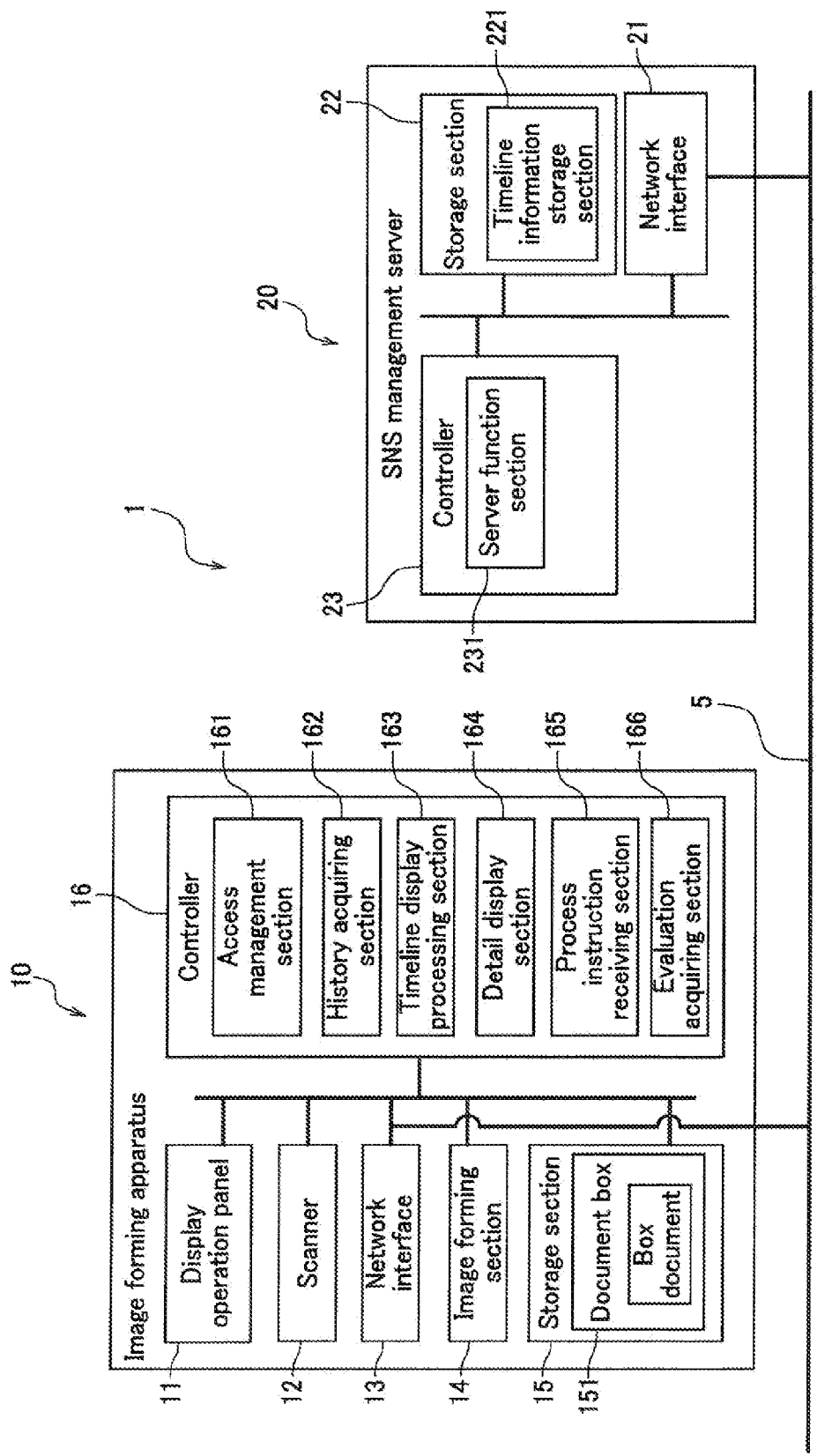
FIG. 2 shows a configuration of an image forming apparatus and an SNS management server included in the document management system shown in FIG. 1.

FIG. 1 shows a configuration of the document management system 1 according to the embodiment of the present disclosure. FIG. 2 shows a configuration of an image forming apparatus 10 and an SNS management server 20 both included in the document management system 1 shown in FIG. 1.

As shown in FIG. 1, the document management system 1 includes the image forming apparatus 10, the SNS management server 20, and a plurality of information processing terminals 30 (for convenience, FIG. 1 only shows the information processing terminals 30-1 and 30-2) that are connected via a network 5, such as the Internet, or the like.

The image forming apparatus 10 is, for example, a digital multifunction peripheral and has the copy function, print function, scanner function, facsimile function, e-mail transmission function, box function, and the like.

The image forming apparatus 10 includes a display operation panel 11, a scanner 12, a network interface 13, an image forming section 14, a storage section 15, a controller 16, and the like.

The display operation panel 11 includes a touch-sensitive liquid crystal display screen, for example. The display operation panel 11 receives various operations that are input to the image forming apparatus 10 and displays the result of input, for example.

The scanner 12 generates image data by reading an image of an original document from a sheet of paper.

The network interface 13 transmits data to and from the SNS management server 20 and the external devices, including the information processing terminals 30, via the network 5.

The storage section 15 (readable recording medium) may be a read-only memory (ROM) that stores programs, a random access memory (RAM) used as a work area, a hard disk drive (HDD) used as a secondary storage section, and the like. The storage section 15 also includes a document box 151 that serves as a shared storage section. The document box 151 stores one or more box documents to allow sharing of the box documents among a plurality of shared users.

The box function of the image forming apparatus 10 is to store image data input thereto to a storage area. More specifically, the image data is stored into the document box 151. For example, a user can input image data through a job executed with the use of the copy function, print function, scanner function, facsimile function, or the like and store the image data as a box document (document information) into the document box 151 with the use of the box function. Also, the user can access the document box 151 from any of the information processing terminals 30 to store the image data. In addition, with the use of the box function, the user can store the image data as image data or store a box document from any of the information processing terminals 30.

The image forming section 14 forms an image on a sheet of paper based on the image data generated by the scanner 12, the image data (job) input via the network interface 13, the document data stored in the document box 151, or the like.

The controller 16 is an arithmetic device, such as a central processing unit (CPU) or the like. The controller 16 executes programs to carry out various processes and controls.

Through execution of the programs stored in the storage section 15, the controller 16 of the image forming apparatus 10 according to the present embodiment operates as an access management section 161, a history acquiring section 162, a timeline display processing section 163, a detail display section 164, and a process instruction receiving section 165.

The access management section 161 implements the function of access management. The access management section 161 permits access to the document box 151 by each shared user through authentication (that is, on condition that the shared user is authenticated). Each shared user is authenticated through, for example, a login operation on the display operation panel 11 or any of the information processing terminals 30.

The access management section 161 permits each shared user having been logged in (hereinafter, may be referred to as a "login user") to access the document box 151 to make an operation for any of the box documents.

The types of operations for a box document include registering a new box document (uploading a new box document), setting to share a box document, updating a box document, attaching a comment to a box document, or the like.

The login operation involves receiving authentication information, such as a user ID or a password, input by a shared user intending to log in.

The history acquiring section 162 implements the function of monitoring operation records. The history acquiring section 162 acquires the records of operations made for a box document by any of the shared users permitted to access the document box 151.

More specifically, when a login user makes an operation for a box document on the display operation panel 11 or any of the information processing terminals 30, the history acquiring section 162 acquires the type of the operation. The type of the operation thus acquired is transmitted as an operation record to the SNS management server 20, together with the user ID of the login user and the document ID of the box document operated.

The timeline display processing section 163 implements the function of processing timeline display. The timeline display processing section 163 acquires a history timeline reflecting the state after the login of a shared user and displays the history timeline showing the operation records in time sequence on the display operation panel 11. The form of display in which items to be displayed are arranged in time sequence may be referred so as timeline display.

The history timeline is generated specifically for each login user. The history timeline shows in time sequence all operation records related to the box documents that are shared to the corresponding login user. The operation records arranged in time sequence include records of operations by the corresponding login user as well as those by other shared users sharing the box documents. The history timeline will be described later in detail.

The acquisition of a history timeline is performed in response to a transmission of an operation record from the history acquiring section 162 or to an acquisition request issued by the timeline display processing section 163 to the SNS management server 20.

The acquisition request includes the user ID of a login user. The acquisition request is issued, for example, when the access management section 161 accepts a login operation, when a login user makes an operation for updating the timeline display, when automatic update of the timeline display is performed at a specific time interval, and so on.

The detail display section 164 implements the function of the detail display. The detail display section 164 receives an input selecting, on the display operation panel 11, one of the operation records presented in the timeline display and displays the details of the box document corresponding to the selected operation record.

The process instruction receiving section 165 implements the function of instructing processes. The process instruction receiving section 165 receives an instruction input when the details of the document information corresponding to the selected operation record are displayed. An instruction input is to instruct a process performed on the box document corresponding to the selected operation record. The process performed on a box document is, for example, to send the box document to a specific destination or to print out the box document.

An evaluation acquiring section 166 implements the function of acquiring an evaluation. The evaluation acquiring section 166 receives, on the display operation panel 11, an evaluation for any of the operation records presented in the timeline display. Each user can input an evaluation for an operation record presented in the timeline display or the detail display by selecting an evaluation button, for example. The types of evaluation buttons include "Nice!", "Like!", or "Good!", for example. The evaluation may be received automatically in response to the detail display by the detail display section 164. The evaluation acquiring section 166 transmits the received evaluation to the SNS management server 20.

The SNS management server 20 is an information processing device, such as a computer. The SNS management server 20 includes a network interface 21, a storage section 22, a controller 23, and so on.

The network interface 21 transmits data to and from the image forming apparatus 10 or the external devices, including the information processing terminals 30, via the network 5.

The controller 23 includes an arithmetic device, such as a CPU. The controller 23 executes programs to carry out various processes and controls.

The storage section 22 (readable recording medium) may be a read-only memory (ROM) that stores programs, a random access memory (RAM) used as a work area, a hard disk drive (HDD) used as a secondary storage section, and the like. The storage section 22 includes a timeline information storage section 221 that is an area for storing history timelines.

The controller 23 of the SNS management server 20 according to the present embodiment executes a program stored in the storage section 22 to operate as an SNS server function section 231.

The SNS server function section 231 implements the function of an SNS server. The SNS server function section 231 has a social networking function of generating a social timeline. The social timeline shows specific pieces of information in time sequence.

The SNS server function section 231 according to the present embodiment generates a history timeline specifically for each shared user with the use of the social networking function. A history timeline is a social timeline showing, as the specific pieces of information, operation records related to box documents.

The SNS server function section 231 receives records of operations input by the shared users sharing the box documents. The SNS server function section 231 sequentially stores the operation records for each user sharing the same box documents. The SNS server storage section 231 generates a history timeline by arranging the sequentially stored operation records in time sequence.

More specifically, the SNS server function section 231 associates the document ID of each box document shared among the shared users with the user IDs of the respective shared users. In addition, the SNS server function section 231 associates each operation record related to the box document with the user IDs of the respective shared users. Then, the SNS server function section 231 stores time sequence information together with the document ID, the user IDs, and the operation record in the timeline information storage 221.

The time sequence information indicates the date and time. More specifically, the time sequence information indicates the date and time at which the user input the corresponding operation for the box document. The time sequence information may indicate the date and time at which the user initiated or completed the corresponding operation.

With the use of the social networking function, the SNS server function section 231 is able to add to the social timeline an evaluation input for a specific piece of information presented in the social timeline.

The SNS server function section 231 according to the present embodiment adds an evaluation to a history timeline with the use of the social networking function, and the evaluation serves as an indication that the contents of the operation record have been confirmed. The evaluation is input for an operation record received from the image forming apparatus 10 and presented in the timeline display.

[Document Management Processing (Timeline Information Registering Processing)]

Figure 3:
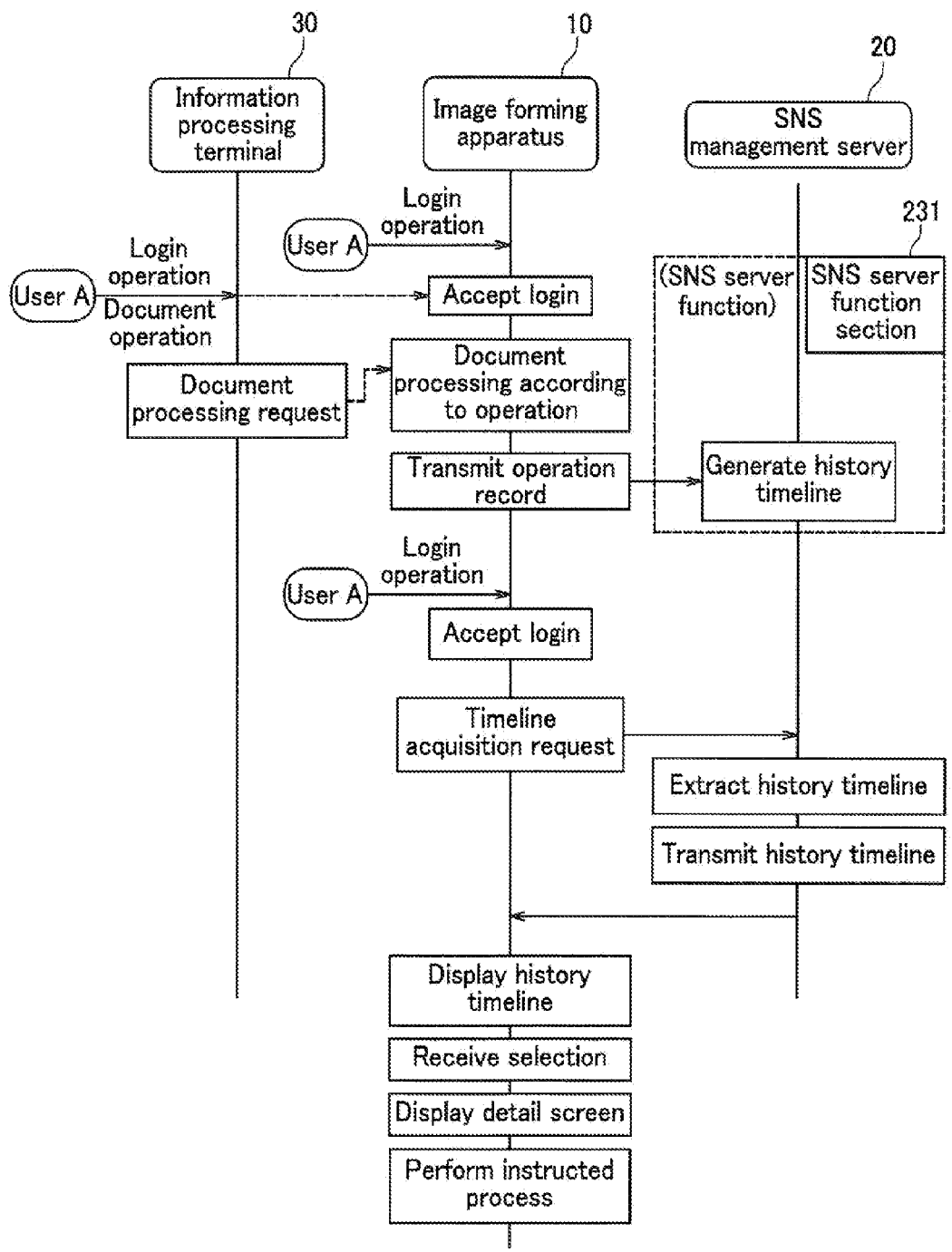
FIG. 3 shows steps of document management processing performed by the document management system shown in FIG. 1.

FIG. 3 shows steps of document management processing performed by the document management system 1 shown in FIG. 1.

The following describes processing performed by the document management system 1 when a user (shared user)

A makes an operation, on the image forming apparatus 10, for a box document that is shared to the user A.

Note that the user A can make an operation for the box document also by using any of the information processing terminals 30. Yet, the following description is particularly directed to the case where the operation is input by using the display operation panel 11 of the image forming apparatus 10.

When the user A makes a login operation on the display operation panel 11 of the image forming apparatus 10, the access management section 161 accepts the login of the user A and permits the user A to access the document box.

Then, when the user A makes an operation for a box document stored in the document box (document operation), the image forming apparatus 10 performs the document processing, such as registering a new box document, setting to share a box document, or updating the box document, according to the document operation made by the user A.

Upon completion of the document operation, the history acquiring section 162 transmits the type of the document operation as an operation record to the SNS management server 20 together with the user ID of the user A.

The SNS server function section 231 of the SNS management server 20 receives the operation record and searches to retrieve the document ID associated with the user ID transmitted with the operation record. The SNS management server 20 then acquires the other user IDs associated with the retrieved document ID.

The SNS server function section 231 of the SNS management server 20 then associates the received operation record with the received user ID as well as with the acquired other user IDs and stores them into the timeline information storage section 221 together with the time sequence information. As a result, the history timelines are generated for the respective shared users such that each history timeline shows all operation records related to all box documents that are shared to the corresponding shared user.

In the case where a corresponding history timeline has been already generated, the SNS server function section 231 updates the existing history timeline by adding the newly stored operation record. As a result, the updated history timeline is generated.

To make an operation for a box document by using one of the information processing terminals 30, the user A (or any other shared user) first logs in the image forming apparatus 10 from the information processing terminal 30. In response, the access management section 161 accepts the login of the user A and permits the user A to access the box document. Then, the user A makes a desired document operation.

In response to the document operation, the information processing terminal 30 issues a document processing request to the image forming apparatus 10. Once the image forming apparatus 10 receives the document processing request, the history timelines are generated in the same manner as in the case where the document operation is input on the image forming apparatus 10.

Next, the following describes the timeline display processing performed on the display operation panel 11 of the image forming apparatus 10.

The timeline display processing is initiated when a shared user logs in by operating the display operation panel 11.

When the user A makes a login operation on the display operation panel 11, the access management section 161 accepts the login of the user A and permits the user A to access the box document.

Once the user logs in, the timeline display processing section 163 issues an acquisition request for a history timeline to the SNS management server 20. As described above, the acquisition request is issued when, for example, the access management section 161 accepts a login operation, when a login user makes an operation for updating the timeline display, when automatic update of the timeline display is performed at a specific time interval, and so on.

The SNS management server 20 receives the acquisition request from the timeline display processing section 163 of the image forming apparatus 10. In response, the SNS server function section 231 transmits a history timeline that is specific to the login user to the image forming apparatus 1.

More specifically, the SNS management server 20 extracts all document IDs associated with the user ID that is acquired from the acquisition request. The SNS management server 20 then extracts a history timeline showing, in time sequence, operation records related to the box documents having the extracted document IDs. The history timeline thus extracted is transmitted to the image forming apparatus 10.

The timeline display processing section 163 of the image forming apparatus 10 receives (acquires) the history timeline transmitted from the SNS server function section 231 and displays it on the display operation panel 11.

Figure 4:
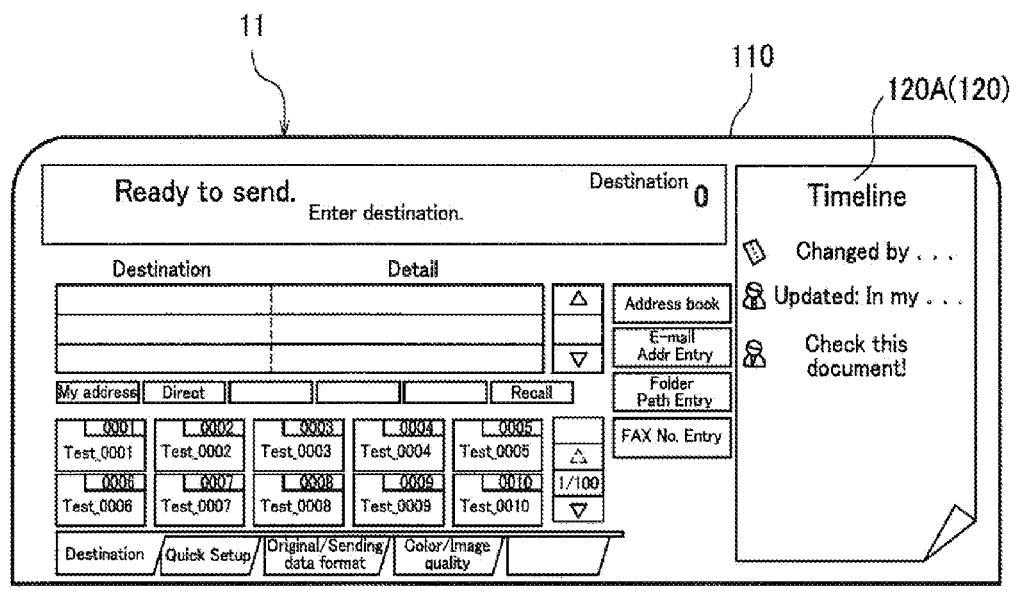
FIG. 4 shows a display example of a timeline screen displayed through the document management processing shown in FIG. 3.

FIG. 4 shows a display example of a timeline screen displayed on an existing screen 110 through the document management processing shown in FIG. 3. On the existing screen 110, a timeline screen 120A showing a history timeline is displayed.

As shown in FIG. 4, the timeline screen 120A is presented as part of the existing screen 110 displayed on the display operation panel 11 of the image forming apparatus 10.

In this example, the timeline screen 120A shows, in the form of timeline display, the records of operations made by the other shared users. The operation records by the other shared users relate to one of the box documents shared to the login user A having the user ID acquired from the SNS management server 20.

In the example shown in FIG. 4, the respective operation records presented on the timeline screen are "Changed by . . . " indicating that the box document has been changed, "Updated: In my . . . " indicating that the box document is updated, and "Check this document!" indicating the comment by the user. The operation records are presented in time sequence and each in association with a document (a picture representing the document) subjected to the operation or with an operator (a picture representing the user) who input the operation.

According to the present embodiment, each shared user can input text for posting a comment or the like by operating the keys on the display operation panel 11 when the timeline screen 120A is displayed in response to the login of the shared user to the image forming apparatus 10. The input text constitutes an operation record related to the corresponding box document.

The display of "Check this document!" shown in FIG. 4 is the contents of the comment input by the shared user represented by the associated the picture representing the user.

The operation record is not limited to a document operation or a comment and may include a record of printing made in an environmentally friendly manner by the shared user. In other words, the history timeline may include, as information to be displayed, various operation records related to a shared box document.

[Document Sharing Processing]

Figure 5:
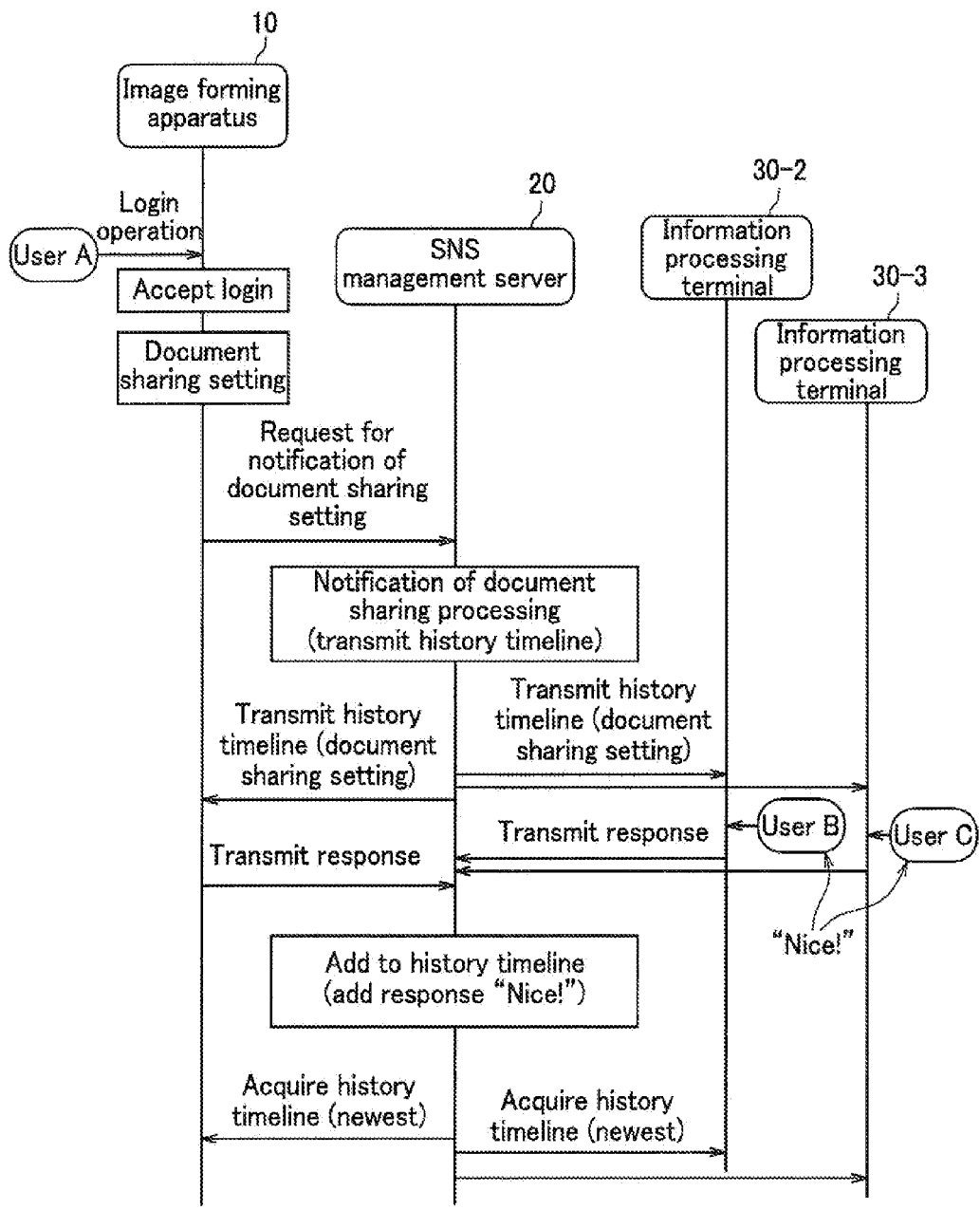
FIG. 5 shows steps of document sharing setting processing performed by the document management system shown in FIG. 1.
Figure 6:
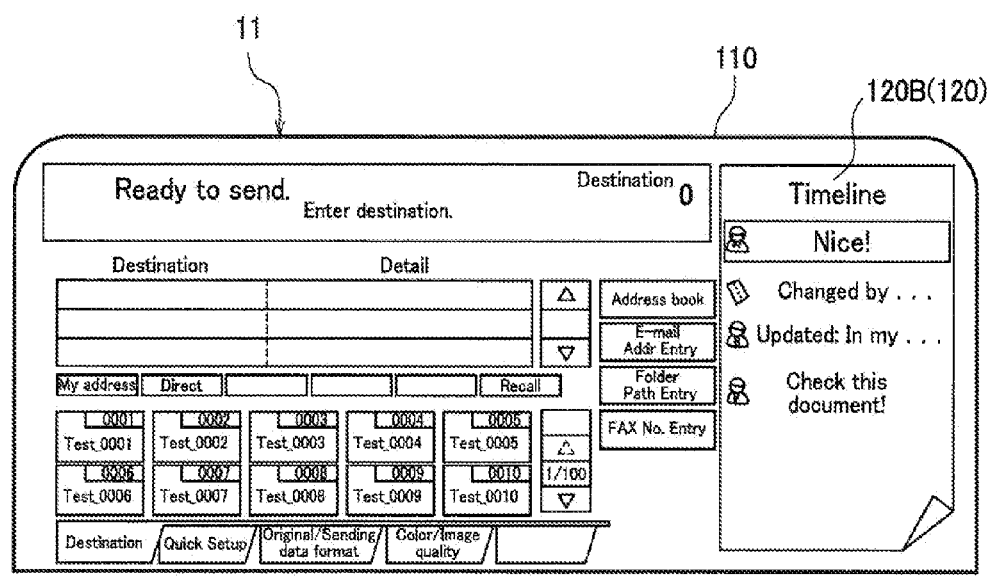
FIG. 6 shows a display example of a timeline screen displayed through the document sharing setting processing shown in FIG. 5.

FIG. 5 shows steps of a document sharing setting processing performed by the document management system 1 shown in FIG. 1. FIG. 6 shows a display example of a timeline screen displayed through the document sharing setting processing shown in FIG. 5.

In the example shown in FIGS. 5 and 6, the user A operates the display operation panel 11 of the image forming apparatus 10 to share a box document A between the users A and B as well as between the users A and C. The box document A is stored in the image forming apparatus 10.

As shown in FIG. 5, when a login operation made on the display operation panel 11 is accepted, the user A is permitted to access the document box.

Next, the user A operates the display operation panel 11 to make the setting to share the box document A stored in the document box between the user A and the user B as well as between the user A and the user C. In response, the image forming apparatus 10 performs the document sharing processing for the box document A designated by the document processing function.

After the document sharing processing is completed, the history acquiring section 162 of the image forming apparatus 10 requests the SNS management server 20 to notify the shared users B and C designated as the sharers that the document sharing setting has been made.

Upon receipt of the notification about the document sharing setting from the history acquiring section 162, the SNS management server 20 stores information indicating that the users B and C are the shared users associated with the box document A.

More specifically, the SNS management server 20 associates the respective user IDs of the users A, B, and C with the document ID of the one box document A. The user IDs of the users A, B, and C are registered in advance in the SNS management server 20.

Then, based on the request for notifying about the document sharing setting, the SNS server function section 231 adds the operation record indicating the sharing of the box document A to the respective history timelines for the users A, B, and C. In the manner described above, the SNS server function section 231 transmits the respective updated history timelines to the shared users A, B, and C and notifies the shared users A, B, and C that the document sharing setting has been made.

More specifically, each of the image forming apparatus 10 (user A), the information processing terminal 30-2 (user B), and the information processing terminal 30-3 (user C) receives the corresponding history timeline to display the received history timeline on the timeline screen 120 that is for a corresponding one of the users A, B, and C. As a result, an operation record indicating that the user A has made the setting to share the box document A with the users B and C (for convenience, the operation record is referred to as "document sharing setting") is presented on each timeline screen 120.

Then, the users B and C can make an evaluation for the document sharing setting displayed in the history timeline by making, for example, an input selecting the "Nice!" button to show appreciation for the document sharing setting.

The information processing terminals 30-2 or 30-3 transmits to the SNS management server 20 a response indicative of a push of the "Nice!" button by the corresponding user B or C (for convenience, the response is referred to as the "document sharing approval").

Upon receipt of the response from the user B or C, the SNS server function section 231 of the SNS management server 20 updates the respective history timelines of the users A, B, and C by adding the document sharing approval.

More specifically, the SNS server function section 231 generates an operation record indicating "Nice!" based on the response from the user B or C and registers (stores) the operation record as the newest operation record to the timeline information storage section 221.

The SNS server function section 231 then transmits the respective history timelines updated in the above-described manner to the users A, B, and C.

Each of the image forming apparatus 10 (user A), the information processing terminal 30-2 (user B), and the information processing terminal 30-3 (user C) acquires the corresponding history timeline to display the history timeline in which the operation record indicating "Nice!" is presented as an indication of the document sharing approval.

The display of "Nice!" in the respective history timelines allows each user to confirm that the user B or C has approved the document sharing.

FIG. 6 shows a display example of a timeline screen displayed on the existing screen 110 through the document sharing setting processing shown in FIG. 5. On the existing screen 110, a timeline screen 120B showing a history timeline is displayed.

The timeline screen 120B shown in FIG. 6 is in the state after a response indicating "Nice!" is received for the newest operation record in the timeline screen 120A displayed on the existing screen 110 as shown in FIG. 4.

That is, the timeline screen 120B shown in FIG. 6 is an updated version of the timeline screen 120A shown in FIG. 4 by adding the indication of "Nice!"

[Operation Record Selecting Processing on History Timeline]

Figure 7:
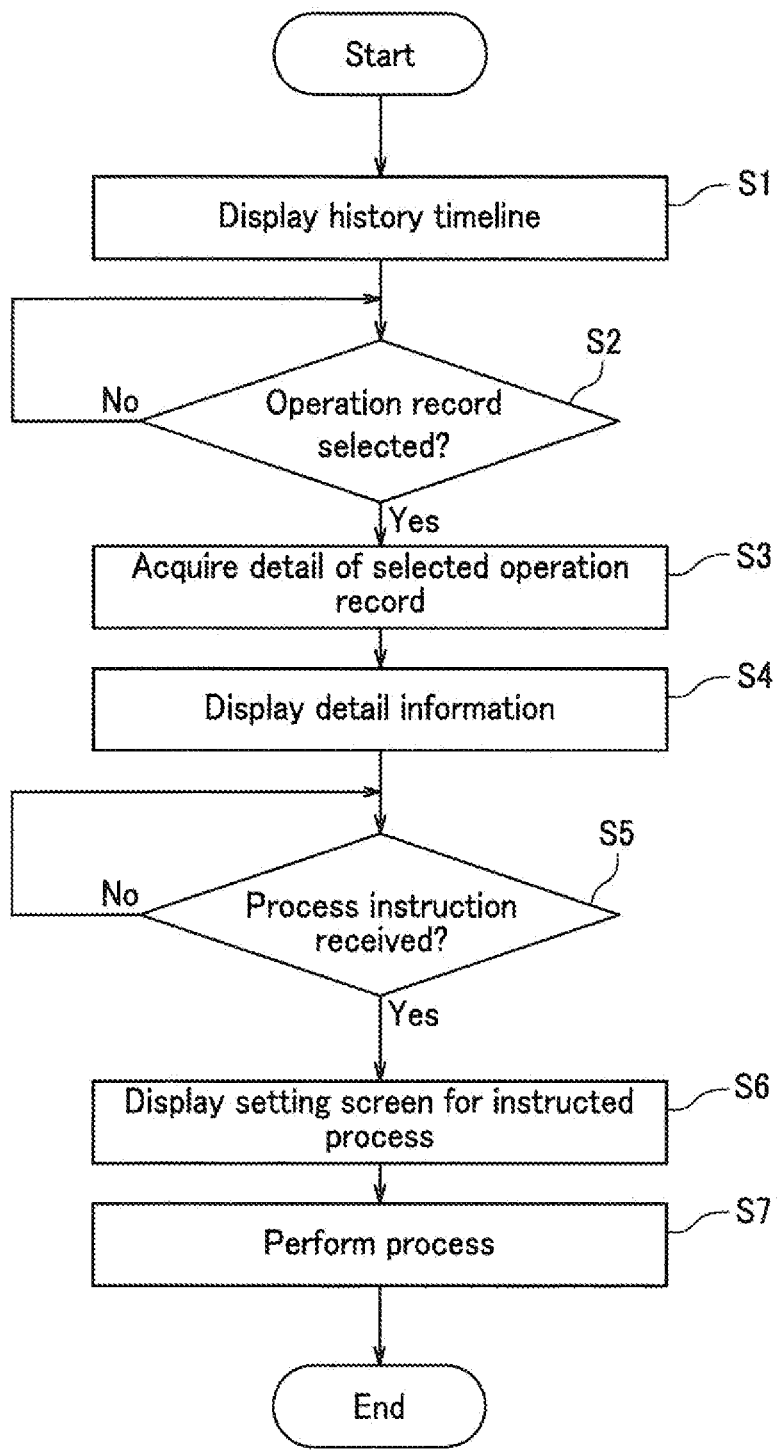
FIG. 7 shows steps of timeline selection processing performed by the image forming apparatus.

FIG. 7 shows steps of an operation record selecting processing on a history timeline displayed on the image forming apparatus 10 according to the present embodiment.

In the processing for selecting an operation record, first Step S1 is performed to display a history timeline. More specifically, the timeline display processing section 163 of the image forming apparatus 10 displays on the display operation panel 11 the history timeline showing operation records.

As described above, the timeline display is presented in the form of the timeline screen 120, such as the timeline screen 120A (see FIG. 4) or the timeline screen 120B (see FIG. 6).

In this way, Step S1 is completed and the processing moves to Step S2.

In Step S2, a determination is made as to whether any operation record is selected. In this step, the detail display section 164 of the image forming apparatus 10 receives a selection of an operation record on the timeline screen 120 displayed in Step S1 and determines whether or not any of the operation records displayed has been selected.

When a selection of an operation record is input, the processing moves to Step S3 (Step 2: Yes). When no selection is input, Step S2 is repeated (Step S2: No).

In Step S3, the details of the selected operation record are acquired. More specifically, the detail display section 164 of the image forming apparatus 10 requests the SNS management server 20 for acquisition of the detail information of the operation record selected in Step S2. The detail display section 164 then acquires the detail information that is transmitted from the SNS server function section 231 of the SNS management server 20 in response to the acquisition request.

In this way, Step S3 is completed and the processing moves onto Step S4.

In Step S4, the detail information is displayed. More specifically, the detail display section 164 of the image forming apparatus 10 displays the detail information acquired from the SNS management server 20 on the display operation panel 11 in the form of the detail display screen.

The detail information displayed in the form of the detail display screen includes information indicating, for example, the user who input the operation, the operation date and time, the name of the document subjected to the operation, the type of operation, the number of pages, the data type, and so on. The detail display screen also displays "Print" and "Send" buttons for selecting (making instruction input of) the corresponding process (see FIG. 8B).

In this way, Step S4 is completed and the processing moves onto Step S5.

In Step S5, a determination is made as to whether a process instruction is received. In this step, the process instruction receiving section 165 of the image forming apparatus 10 determines whether or not an instruction input is received as a result of the selection of, for example, the "Print" or "Send" button on the detailed display screen displayed in Step S4.

When an instruction input is received, the processing moves to Step S6 (Step 5: Yes). When no instruction input is received, Step S5 is repeated (Step S5: No).

In Step S6, the setting screen for the instructed process is displayed. More specifically, the process instruction receiving section 165 of the image forming apparatus 10 displays the setting screen for the process corresponding to the instruction input that is received in Step S5.

In this way, Step S6 is completed and the processing moves onto Step S7.

In Step S7, the instructed process is performed. In this step, the process instruction receiving section 165 of the image forming apparatus 10 performs the process according to Step S5 based on the setting made on the screen shown in Step S6.

Figure 8A:
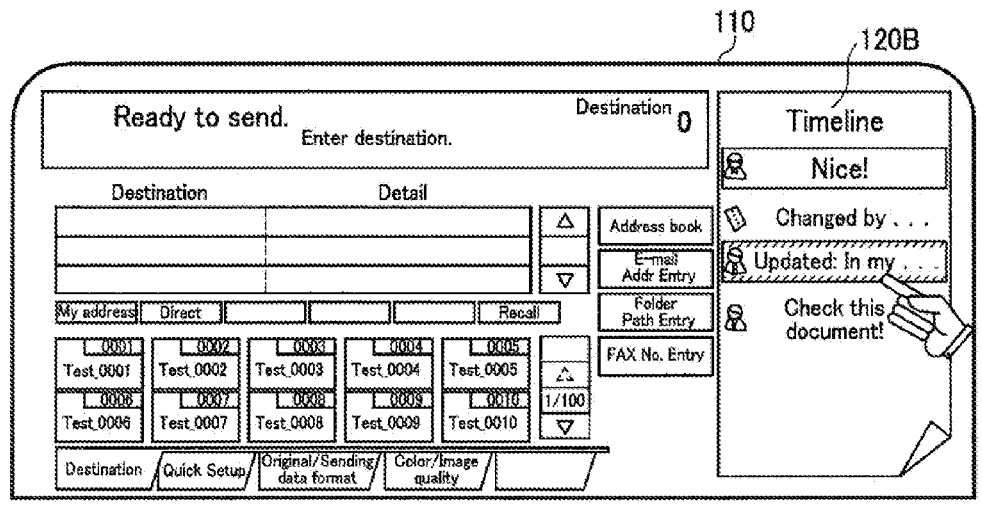
FIGS. 8A-8C show a screen transition made during the timeline selection processing shown in FIG. 7.
Figure 8B:
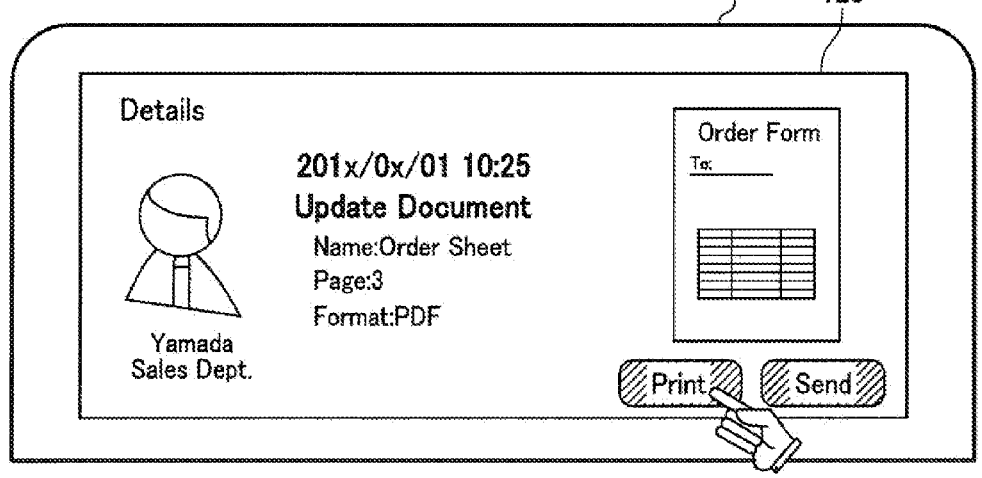
Figure 8C:
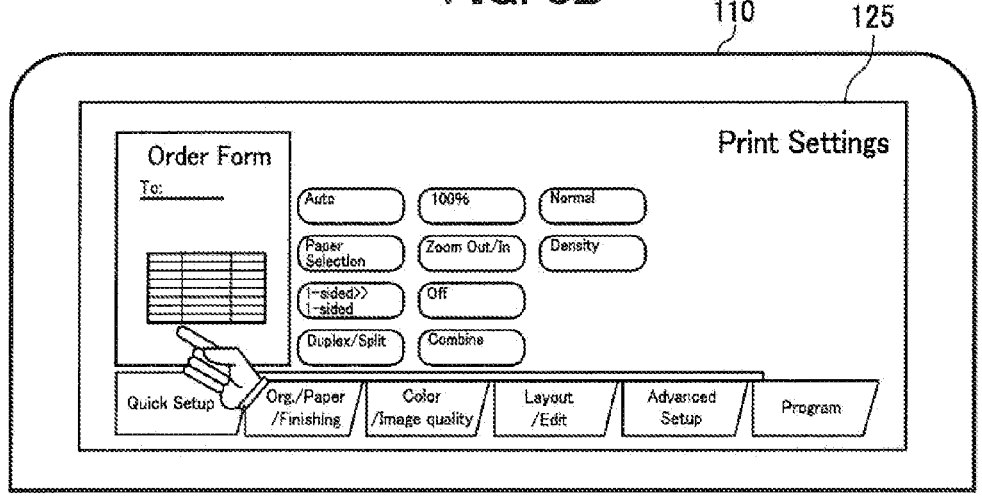

FIGS. 8A-8C show a screen transition made during the operation record selecting processing shown in FIG. 7.

The example of the screen transition shown in FIGS. 8A-8C assumes the case where the operation record indicating "Updated: In my . . . " is selected on the timeline screen 120B (see FIG. 6).

When the operation record indicating "Updated: In my . . . " is selected on the timeline screen 120B shown in FIG. 8A (or similarly on the timeline screen 120A), the detail information of the operation record selected in Step S4 shown in FIG. 7 is displayed on a detail screen 123 as shown in FIG. 8B.

The detail information of the selected operation record displayed in the detail screen 123 includes the picture representing the user who input the document operation, the operation date and time, the operation type, the name of the document operated, the number of pages of the document, the document format, and so on. The detail information is displayed together with, for example, the preview image of the document, the "Print" button, the "Send" button, and so on.

Upon selection of the "Print" button on the detail screen 123 by the user, a print setting screen 125 shown in FIG. 8C is displayed in Step S6 shown in FIG. 7.

On the print setting screen 125, the buttons for various setting items are displayed along with the preview image of the document reflecting the setting made with the use of the buttons.

After making the desired print setting on the print setting screen 125 as shown in FIG. 8C, the user may select the preview image of the document, for example. In response, the controller 16 controls the image forming section 14 to perform, in Step S7 of FIG. 7, the print processing with the setting having been made. As a result, a sheet of paper on which the document image is formed (printed image) is output.

Next, the following describes a document management program. The image forming apparatus 10 and the SNS management server 20 are each provided with a non-transitory computer readable recording medium. Each non-transitory computer readable recording medium stores the document management program.

The document management program causes the controller 16 (computer) of the image forming apparatus 10 and the controller 23 (computer) of the SNS management server 20 to implement the shared storage function, the access management function, the history acquisition function, the SNS server function, and the timeline display processing function.

The image forming apparatus 10 according to the present embodiment includes the access management section 161, the history acquiring section 162, and the timeline display processing section 163. The SNS management server 20 includes the SNS server function section 231. The document box 151 that implements the shared storage function stores one or more box documents to allow sharing of the box documents among a plurality of shared users. The access management section 161 that implements the access management permits access to the document box 151 by each shared user through authentication (that is, on condition that the shared user is authenticated). The history acquiring section 162 that implements the history acquisition function acquires a record of an operation that is input for any of the box documents by any of shared users permitted to access the document box 151. The SNS server function section 231 that implements the SNS server function has a social networking function of generating a social timeline showing specific pieces of information in time sequence and generates a history timeline for each of the plurality of the shared users. Each history timeline is a social timeline showing, as the specific pieces of information, the operation records acquired by the history acquiring section 162 for the respective shared users permitted to access the document box 151. The timeline display processing section 163 that implements the timeline display processing function acquires a history timeline reflecting the state after the shared user is authenticated and displays the history timeline showing the operation records in time sequence.

Consequently, on condition that a plurality of shared users share a box document as well as operation records related to the box document, the present embodiment displays, with the use of the social networking function, the operation records in a manner that the shared users can intuitively comprehend them at a glance.

According to the present embodiment, in addition, with the social networking function of adding an evaluation for a specific piece of information included in a social timeline, the SNS server function section 231 adds an evaluation for an operation record displayed in the history timeline and the evaluation added to the history timeline serves as an indication that the operation record has been confirmed.

That is, the present embodiment displays an evaluation (for example, a "Nice!" message) for an operation record related to a box document, so that each shared user can confirm that the operation record is approved (confirmed) by another shared user.

Therefore, with the use of the social networking function, the present embodiment provides a way to readily confirm a reaction from other shared users to an operation record related to a box document.

According to the present embodiment, in addition, the image forming apparatus 10 includes the detail display section 164 that receives an input selecting an operation record presented in a timeline display and in response displays the details of the box document corresponding to the selected operation record.

Consequently, with an intuitive operation to an operation record presented in the form of timeline display, the shared user can cause the details of the corresponding box document to be displayed.

According to the present embodiment, in addition, the image forming apparatus 10 includes the process instruction receiving section 165 that receives an instruction input for a process related to the box document corresponding to the detail information displayed.

Consequently, the image forming apparatus 10 according to the present embodiment can ensure easy transition to printing or sending of a box document, while displaying the details of the box document corresponding to an operation record on the display operation panel 11.

What is claimed is:

1. A document management system comprising:
a first memory storing a first program;
a second memory storing a second program;
a first processor configured to operate through execution of the first program;
a second processor configured to operate through execution of the second program; and
a display operation panel, wherein
the first processor:
causes the first memory to store document information to share the document information among a plurality of shared users;
permits access to the first memory by each shared user through authentication; and
acquires an operation record that is input for the document information by any of the shared users permitted to access the first memory,
the second processor has a social networking function of generating a social timeline showing specific pieces of information in time sequence and generates a history timeline for each shared user, each history timeline being a social timeline showing as the specific pieces of information the operation records acquired for the shared users permitted to access the first memory,
the first processor acquires, for each shared user, a history timeline that reflects a state after the authentication of the shared user to display the history timeline showing the operation records in time sequence on the display operation panel,
the plurality of shared users includes a first user and a second user,
the first processor acquires the operation record that is input for the document information by the first user,
the second processor generates the history timeline showing the operation records input by the first user in time sequence,
the first processor:
receives an evaluation for one of the operation records input by the first user from the second user; and
transmits the evaluation to the second processor,
the second processor adds, to the history timeline showing the operation records input by the first user, the evaluation transmitted from the first processor as an indication that the one of the operation records has been confirmed as approved by one of the shared users,
the second memory stores the history timeline for each shared user, and
the second processor stores into the second memory a document ID of the document information and a user ID of each shared user in association,
in response to the first user performing, as the operation that is input for the document information, another operation to make setting to share the document information stored in the first memory between the first user and the second user, the first processor requests the second processor to notify the second user that the setting to share the document information has been made,
the second processor:
adds, as the operation record, the operation to make setting to share the document information to the history timeline for each shared user based on the request from the first processor;
generates another operation record in response to the first processor receiving a response from the second user that is indicative of document sharing approval as the evaluation for the operation to make setting to share the document information; and
registers the generated operation record to the second memory and updates the history timeline for each shared user, and
the first processor acquires and displays the updated history timeline in which the response indicative of the document sharing approval is presented.

2. A document management system according to claim 1, wherein
the first processor receives an input selecting one of the operation records displayed in time sequence and displays, on the display operation panel, details of the document information corresponding to the selected operation record.

3. A document management system according to claim 2, wherein
the first processor receives, in response to the details of the document information being displayed on the display operation panel, an instruction input that instructs a process to be performed on the corresponding document information.

4. A document management system according to claim 1, wherein
the second processor stores into the second memory each operation record with the user IDs.

5. A document management system according to claim 1, comprising:
an image forming apparatus and an SNS management server, wherein
the image forming apparatus includes the first processor, the first memory, and the display operation panel, and
the SNS management server includes the second processor and the second memory.

* * * * *